Oct. 16, 1962  E. M. FISCHEL  3,058,357
RATE GYROSCOPE
Filed July 19, 1960

EDUARD M. FISCHEL
INVENTOR.

BY Andrew L. Bain
Sal A. Fiavratona
ATTORNEYS

United States Patent Office 3,058,357
Patented Oct. 16, 1962

3,058,357
RATE GYROSCOPE
Eduard M. Fischel, Caldwell, N.J., assignor to General Precision Inc., Little Falls, N.J., a corporation of Delaware
Filed July 19, 1960, Ser. No. 43,952
3 Claims. (Cl. 74—5.4)

The present invention relates to a rate gyroscope and more particularly to rate gyroscope having its stator removed from the precession axis gimbal to simplify the design and reduce production cost.

At present, the measurement of a rate of turn is accomplished with ordinary gyro motors, and with units utilizing oscillating tines. The gyro motors incorporate spring restraints, fluid restraints, or magnetic restraints. The disadvantages of these presently utilized gyros are that the cost is high and that errors occur due to mass instability. In addition, errors occur due to restraint caused by pigtails or other such devices utilized to transmit power to and accept signals from the precession gimbal. Also, presently used gyros have an undesirable high ratio of moment of inertia of the precession gimbal about the precession axis to the moment of inertia of the gyro wheel about the spin axis.

The present invention in its preferred form comprises a gyroscope in which the motor stator is separated from the gimbaled flywheel or rotor and wherein the primary torque source may be a shaded pole single phase motor, a two phase hysteresis motor, or the like. The stator is rigidly fixed to the gyro case and is disposed outside the precession gimbal which is spring restrained and provided with dash-pot dampening means. The gimbal is mounted in conventional type jewel bearings and provided with a suitable gyro pick-off, such as an induction type pick-off with the rotor mounted outside of the stator. Hence, since there is no fluid in the unit, the gyro is easy to balance while wiring is maintained at a bare minimum, and no pigtails are needed. In this manner, a simple rate gyroscope is obtained having less parts than presently used gyroscopes, with lower production cost without sacrifice in performance.

In brief, a low cost motor for gyroscopes is disclosed wherein the stator is on the outside of the precession gimbal and maintained stationary, so that pigtails are not needed and, accordingly, the wiring is maintained at a bare minimum. The gimbal only carries the weight of the flywheel and there is no electric power consumption because the stator is on the outside. In this manner, the moment of inertia about the precession axis is a minimum, and the ratio of weight to angular momentum of the gimbal and rotor is a minimum resulting in good dynamic behavior. Therefore, by separating the stator from the gyro wheel and making it stationary, the present invention simplifies gyro desgin and reduces production costs while increasing thermal stability. Since the rotor alone is gimbaled and can precess, the unit is more reliable than presently known gyros, and has a higher ratio of angular momentum to moment of inertia about the precession axis, which means a larger output per unit input.

In general, single degree-of-freedom gyros are normally used to measure rate of movement rather than amount of movement. As is well known, a basic single degree of freedom gyro has freedom only about its precession or output axis. Therefore, a pick-off on the output axis permits measurement of displacement in this axis. Movement around the spin axis of the rotor has no affect, while movement around the imaginary input axis moves the spinning rotor out of its geometric plane of spin, this movement imposes a torque on the spinning rotor and the rotor precesses around the precession or output axis. If the gyro is rotated around the input axis it will continue to precess as long as this rotation is continued until the spin axis aligns itself with the input axis, at which point the gyro will be moving around the spin axis and no longer usable as a rate gyro. Therefore, spring restraints are imposed on the gimbal to hold it in center, and if precession occurs the springs act as a restraining means.

With spring restraint on the gimbal, the complete gyro can be rotated indefinitely around the input axis, the rate that the gyro is rotated about the input axis is known as the input rate and the greater the input rate, the greater the force against the springs to cause precession. By controlling the spring rate, force per unit of displacement, the amount of pick-off displacement can be predetermined for any specified input rate.

As is well known, if a spring-mass system is put into motion, various factors, such as friction between the mass and the atmosphere, bearing friction, and the like phenomena tend to slow down the oscillation and eventually bring the system to rest, as a result of the dampening present. These factors naturally present, however, have little dampening effect over short time periods, and added dampening is often provided in rate gyros. Therefore, dashpots are provided to add dampening to make the unit a dampened rate gyro. Therefore, when the gyro precesses, it creates movement of the dash pot pistons through a suitable dampening medium.

An object of the present invention is the provision of a rate gyro whose stator is removed from the precession axis gimbal.

Another object is to porvide a rate gyroscope wherein the stator is separated from the gyro wheel and made stationary with respect thereto, so that the gyro rotor is gimbaled and can precess.

A further object of the invention is a provision of a rate gyroscope wherein the moment of inertia about the precession axis is a minimum so that a high ratio of angular momentum to moment of inertia about the precession axis is obtainable.

Another further object is to provide a rate gyroscope wherein the ratio of weight to angular momentum of the gimbal and rotor unit is a minimum for good dynamic behavior.

Other objects and many of the attendant advantages of this invention will be readily appreciated as the same becomes better understood by reference to the following detailed description when considered in connection with the accompanying drawings in which like reference numerals desingate like parts throughout the figures thereof and wherein.

Figure 1:
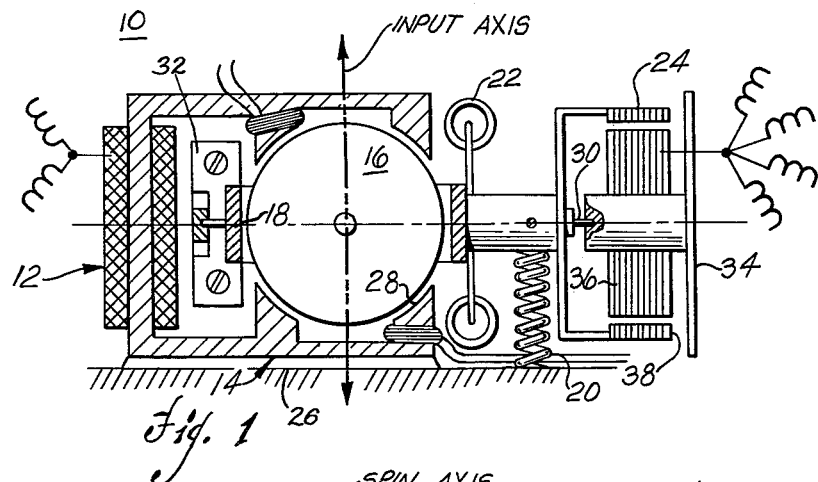
FIGURE 1 is a side view, partly in section, of a preferred embodiment of the invention.

Referring now to the drawings, there is illustrated a preferred embodiment 10 comprising a gyro motor 12 having a stationary stator 14 and a rotor 16 rotatably mounted on a gimbal 18. Restraining spring means 20 are provided between the gimbal and a supporting gyro case 26, partially shown, cooperating with damping means 22. Suitable pick-off means 24 are provided to facilitate measuring the movement of the gimbal about the precession or output axis of the embodiment.

For purposes of simplicity, the preferred embodiment utilizes a shaded pole single phase motor as the primary torque source. The stator 14, which is stationary with respect to the gyro case 26 and rigidly affixed thereto, is disposed outside the precession gimbal 18. The stator is provided with pole faces 28 of sufficient width so that the precession of the rotor 16 does not take it out of the plane of magnetic co-action with the stator. In actual practice, the maximum hang-off of the rotor is approximately 2 degrees.

Figure 2:
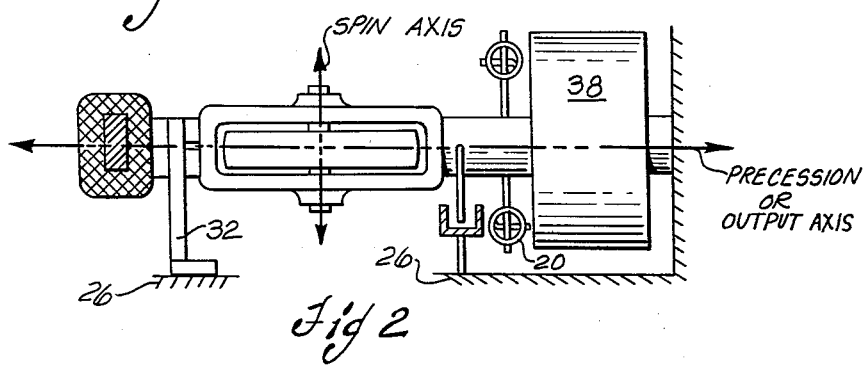
FIGURE 2 is a plan view of the device shown in FIGURE 1.

Although the single phase shaded pole stator is utilized in the preferred embodiment 10, it is obvious that the stator can be of any type of hysteresis or induction motor stator. The rotor 16, which alone is contained in the precession gimbal 18, is a squirrel-cage or hysteresis type rotor. In addition, conventional leads are provided from the motor 12 to a suitable power source, not shown. The gimbal consists of an integral rectangular member, as best shown in FIGURE 2, provided with jewel bearing means 30 rotatably supporting the gimbal at one end on a bracket member 32 fixed to the gyro case 26, and with the other end in a supporting means 34 integral with the gyro case.

Restraining spring means 20, such as the illustrated helical springs, or the like, are provided between the gimbal and the gyro case 26 to hold the gimbal "in center." Therefore, when precession occurs it must now do so against the holding force of the springs 20. In addition, when the gimbal is centered by the springs, the pick-off means 24 can be oriented so as to be at null. With the spring restraint on the gimbal, the complete gyro case can be rotated indefinitely around the input axis. The rate that the gyro rotates about the input axis is the input rate and the greater the input rate, the greater the force against the springs 20 trying to cause precession. Therefore, by controlling the spring rate, force per unit of displacement, the amount of pick-off displacement can be predetermined for any specified input rate.

As is well known, whenever a spring-mass system is put into motion, various factors such as bearing friction, and the like, tend to slow down the oscillation and eventually bring the system to rest. However, as previously stated, over short time periods these factors naturally present in the system have little dampening effect and added dampening is required. Therefore, the dampening means 22, such as the illustrated dash-pots, are provided so that the springs 20 and the dash-pots are alternately disposed each 90° about the precession axis. The dash-pots are of conventional design, wherein the piston and cylinder of each dash-pot is respectively attached to the gimbal 18 and to the gyro case 26. Hence, when the gyro precesses, it creates movement of the piston through a dampening medium within the cylinder to suitably dampen the spring mass system. The dampening medium may be air, helium, or any other gas or non-corrosive liquid, depending on the operational environment of the embodiment 10.

The pick-off means 24, for measuring gimbal movements about the precession or output axis, consists of a pick-off stator 36, fixed to the gyro case end supporting means 34 and pick-off rotor 38 concentrically mounted. The pick-off rotor is fixed to the gimbal 18 and moves therewith with respect to the fixed pick-off stator 36, which is provided with suitable terminals coupled to a source of electrical energy. The pick-off means 24 produces a given output for unit of displacement so that the gyro will produce a known pick-off output for any specified input rate. In brief, the pick-off is basically a differential transformer wherein the mutual induction between the stator 36 and the rotor 38 is varied with variations in the relative angular position of these members. Therefore, as the gimbal moves this motion is translated into an electrical energy which is proportional and phase sensitive to the gyro input angular velocity.

If deemed desirable the pick-off means can be of any suitable design, such as the rotor being a permanent magnet or, at least, of a type which does not require an input voltage, so that pigtails are unnecessary. In the preferred embodiment, the usual induction type pick-off means is modified so that the stator 36 is on the inside and the rotor on the outside to improve resolution and also permit the use of less expensive bearings, such as illustrated bearing means 30.

In the operation of the preferred embodiment 10, the gyro precesses in the same manner as conventional rate gyros once subjected to input rates about its input axis. However, since only the rotor 16 is gimbaled, the rotor alone precesses, while the stator obviously remains fixed. The stator 14, previously disclosed, is provided with pole faces 28 of sufficient width so that the precession of the rotor does not take it out of the plane of magnetic co-action with the stator.

As the rotor 16 and the supporting gimbal 18 precess they act against the pair of springs 20 and the pair of dash-pots 22 which are alternately disposed each 90° about the precession axis. When the precession torque is balanced by the spring torque the resulting hang-off is a measure of the rate-of-turn. This balanced situation occurs rather quickly after the transients have died out. Of course, it will be obvious that the dash-pots 22 are included only for dampening purposes. The hang-off of the rotor is sensed by the pick-off means 24 so that the pick-off output is proportional to the rate input.

Hence, the preferred embodiment 10 discloses a single degree-of-freedom gyro used to measure the rate of movement, rather than amount of movement, about the input axis. The pick-off means 24 about the precession axis permits measurement of displacement about the axis. Movement about the spin axis has no effect, but movement around the imaginary input axis moves the spinning rotor out of its geometric plane of spin. This imposes a torque on the spinning rotor 16 and the rotor precesses around the precession axis, in one direction for a given torque and in the opposite direction for a reverse torque application. The precession will stop whenever the applied torque is terminated, and the greater the applied torque, the greater the rate of precession. The restraining spring means 20 bias the gimbal 18 to hold it in center, so that precession occurs against the holding force of the springs. Once precession ceases, the springs will recenter the gimbal 18, at which point the pick-off means 24 is oriented so as to be at null when the gimbal is centered by the springs 20. The dash-pots 22 are provided to add dampening to the spring-mass system not available in the system from inherent bearing friction, and the like causes of dampening, which have little dampening effect over short time periods.

Figure 3:
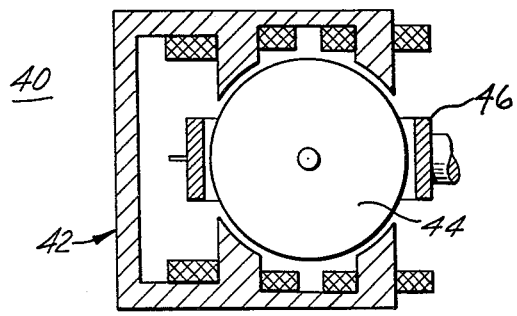
FIGURE 3 is a sectional side view illustrating a modification of the motor of FIGURE 1.

FIGURE 3 illustrates a preferred embodiment 40 wherein the single phase shaded pole rotor is replaced with a two phase hysteresis rotor as a primary torque source for the gyro. A two phase stator 42 is fixed to the gyro case 26 in the same manner as the stator 14 in the preferred embodiment. A rotor 44 composed of a soft iron core with a circumferential hysteretic material surface portion for suitable magnetic co-action with the stator, is rotatably supported on a gimbal 46. The remainder of the gyro structure is substantially similar to that disclosed in the preferred embodiment 10. Also, the operation of the modification 40 is similar to that of the preferred embodiment. Accordingly, there is disclosed a rate gyroscope having the stator removed from the precession axis gimbal to simplify the design, improve the inherent characteristics, and reduce the production costs.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claims.

What is claimed is:

1. A rate gyro comprising a fixed gyro case, a stator fixedly attached to the gyro case, a gimbal rotatably mounted between the pole faces of said stator, a rotor rotatably supported on said gimbal, said gimbal journalled along the precession axis of said rotor, spring means operatively coupled to said gimbal to maintain it in an in-center position, dampening means coupled to said gimbal, said spring means and dampening means being alternately disposed, each 90° about the precession axis of the gyro pick-off means operatively coupled to said gimbal to measure the hang-off of said gimbaled rotor, so that when the precession torque is balanced by the torque of said spring means, the hang-off is a measure of the rate of rotation of the gimbal.

2. A rate gyro having a fixed stator, a gimbal, a rotor mounted on said gimbal between the poles of said stator, said gimbal journaled for rotation about an axis 90° from the spin axis of said rotor, spring means coupled to said gimbal, dampening means coupled to said gimbal, and said spring means and said dampening means alternately disposed each 90° about the precession axis of said gimbal, and pick-off means operatively coupled to said gimbal to obtain a given output per unit of displacement of said gimbal about the precession axis.

3. A rate gyro, comprising in combination:
a gyro case;
a stator fixedly attached to the gyro case, said stator including poles of sufficient width;
an integral rectangular gimbal member within said stator;
a rotor mounted in said gimbal between the poles of said stator, said gimbal being journaled for rotation about a precession axis 90° from the spin axis of said rotor;
spring means coupled to said gimbal so that when precession occurs it must do so against the holding force of said spring means;
dash-pot damping means coupled between said gimbal and said case, said spring means and said damping means being alternately disposed, each 90° about the precession axis of said gimbal;
pick-off means for measuring said gimbal movements about the precession axis including a pick-off stator fixed to said case and a concentrically mounted pick-off rotor fixed to said gimbal, said pick-off rotor and stator acting as a differential transformer, the mutual induction between said pick-off rotor and stator being varied with respect to the relative angular position of these members, translating the gimbal motion into an electrical energy proportional and phase sensitive to the gyro input angular velocity.

References Cited in the file of this patent

UNITED STATES PATENTS

| | | |
|---|---|---|
| 2,299,663 | Tilstone et al. | Oct. 20, 1942 |
| 2,607,230 | Stone | Aug. 19, 1952 |
| 2,672,054 | Warren et al. | Mar. 16, 1954 |
| 2,898,765 | Atkinson et al. | Aug. 11, 1959 |

FOREIGN PATENTS

| | | |
|---|---|---|
| 122,639 | Australia | Apr. 3, 1947 |
| 447,909 | Canada | Apr. 20, 1948 |